United States Patent [19]

Bernat

[11] 4,183,377
[45] Jan. 15, 1980

[54] SINGLE HANDLE MIXING FAUCET

[75] Inventor: Georg Bernat, Menden, Fed. Rep. of Germany

[73] Assignee: ITT Industries, Inc., New York, N.Y.

[21] Appl. No.: 861,577

[22] Filed: Dec. 19, 1977

[30] Foreign Application Priority Data

Dec. 22, 1976 [DE] Fed. Rep. of Germany ....... 2658022

[51] Int. Cl.² ............................................ F16K 11/06
[52] U.S. Cl. ............................ 137/625.17; 137/625.4; 137/636.4
[58] Field of Search ............ 137/625.17, 625.4, 636.3, 137/454.6

[56] References Cited

U.S. PATENT DOCUMENTS 3,533,436 10/1970 Parkison ....................... 137/625.4 X

FOREIGN PATENT DOCUMENTS 852533 9/1970 Canada .
989704 5/1976 Canada .

Primary Examiner—William R. Cline
Attorney, Agent, or Firm—James B. Raden; Donald J. Lenkszus

[57] ABSTRACT

A single handle mixing faucet includes a pusher plate which is adjustable by means of the handle to regulate the mixture ratio and the outflow volume of the mixed water. The pusher plate is arranged in the faucet housing parallel to a mean axis to regulate the mixture. The pusher plate engages a head-piece in a slide guide rotating around the mean axis, and can be swivelled around a pivotal axis arranged outside the slide guide perpendicular to the mean axis. To regulate the volume, the pusher plate is carried movably parallel to the mean axis.

4 Claims, 6 Drawing Figures

SINGLE HANDLE MIXING FAUCET

BACKGROUND OF THE INVENTION

The invention relates to a single handle mixing valve and more particularly with a pusher plate to regulate the mixture ratio and the outflow volume of mixed water.

Known mixer valves of this type consist principally of a base-plate arranged immovably in the valve casing in which apertures are provided for the conducting of hot and cold water and for the discharge of mixed water. A pusher plate, displaced by means of a handle, and provided with an overflow passage, is carried on this base-plate to regulate the mixture and outflow volume. The out-flow volume is set by an upwards or downwards movement of the handle and the mixture ratio by swivelling the handle. Mixing valves of the type described are exemplified in U.S. Pat. Nos. 3,324,884; 3,533,436; and 3,788,354.

One problem common to some prior art mixing valves of the character described is that they exhibit a change in the mixture ratio proportional to or even over-proportional to the swivel angle in the medium range—the so-called comfort range—in which a mixed water with a temperature from approximately 30° to 45° C. should be produced in the fitting. This setting range can only be set relatively inaccurately in the case of the known mixer valves so that precise setting of the out-flowing mixed water is practically impossible which is extremely unpleasant particularly in bath and shower systems, etc., because the human body very quickly and easily detects a temperature difference of 1° to 2° C.

SUMMARY OF THE INVENTION

Consequently, the invention is based upon the need to create a faucet of the type described in the introduction which enables the mixed water temperature to be particularly finely and comfortably set in the preferred setting range, in particular between 30° and 45° C. This is brought about in accordance with the invention by the fact that the pusher plate is arranged parallel to a mean axis in the faucet housing whereby, on the one hand, to regulate the mixture, the pusher plate with a head-piece engages in a slide guide movable around the mean axis with a sliding pad arranged outside the mean axis and pivotal around an axis of rotation lying outside the slide guide perpendicular to the means axis, and, on the other hand, to regulate the volume, the pusher plate is carried movably parallel to the mean axis.

The embodiment in accordance with the invention allows only slight or sub-proportional changes in the medium sector of the entire swivel range for the mixture ratio in relation to the swivel angle whereas, in the end ranges, where only cold or only hot water is drawn off, the change is accelerated or over-proportional. By selecting a suitable distance between the sliding pad from the mean axis, the preferred setting range, also designated as the so-called comfort zone, can be set in optimum manner.

BRIEF DESCRIPTION OF THE DRAWINGS

The invention may be better understood from the detailed description taken in conjunction with the drawings in which.

DETAILED DESCRIPTION

Figure 1:
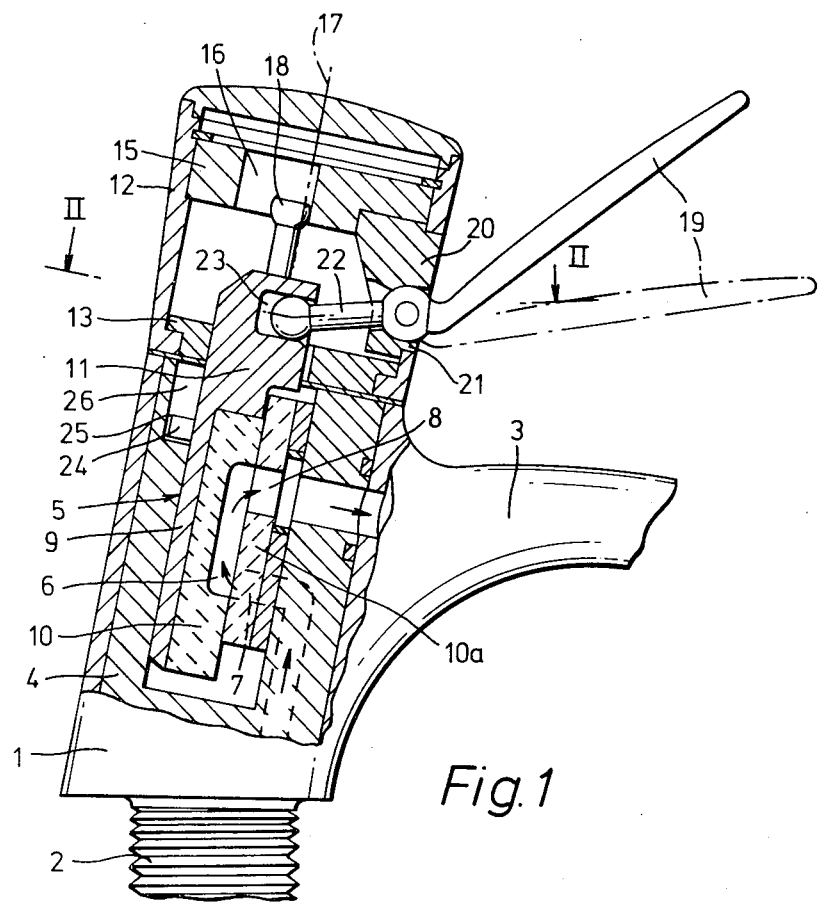
FIG. 1 shows a mixer valve, partly in longitudinal section.
Figure 2:
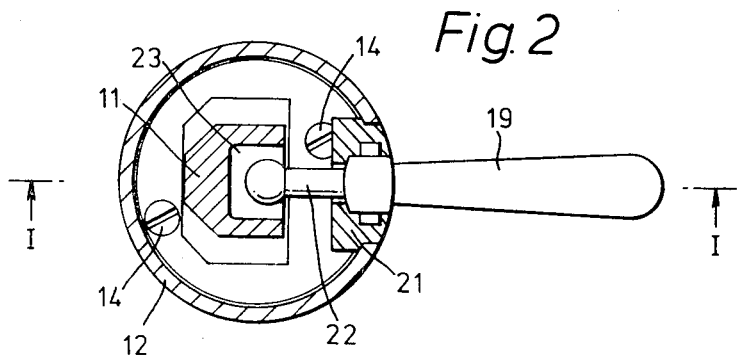
FIG. 2 shows a section through the mixer valve to FIG. 1 along the line II.

A cylindrical bushing 4 is inserted into a bore in a faucet housing 1 having a securing nozzle 2 and a spout 3 and is secured. A pusher plate 5 is movably carried in the bushing and, depending upon its position, provides a connection from one of the in-flow passages 7 for hot and cold water running parallel to each other to the mixed water outlet passage 8 via an overflow passage 6.

The pusher plate 5 consists preferably of a fitting 9 of material with good sliding properties and a valve plate 10 of an abrasion-resistant ceramic-oxide material whereby the valve plate 10 is held in a form-fitting manner by the fitting. The valve plate 10 works with a smoothened and lapped surface in conjunction with a base-plate 10a also of a ceramic-oxide which contain the in-flow and out-flow apertures for the hot, cold and mixed water and is immovably fixed in the bushing 4.

To control the pusher plate 5 the fitting 9 is provided with a head-piece 11 which projects into a head-piece casing 12. The head-piece casing is fixed axially but is secured rotatably around a mean axis 17 on the faucet housing 1 by means of a flange 13 and two clamping bolts 14 arranged diagonally to each other in the bushing 4.

A disc 15 is inserted in form-fitting manner in the upper area in the head-piece casing and a slide guide 16 is provided therein. The slide guide carries a sliding pad 18 formed on the head-piece 11 and displaced in relation to the mean axis 17.

For easier manipulation of the mixer valve, a control lever 19 is carried radially in the wall of the head-piece casing in bearing shells 20 and 21 and can be swivelled up and down. The actuating pin 22 of the operating lever engages in a recess 23 in the head-piece 11 arranged perpendicular to the mean axis 17. If the control lever 19 is now moved upwards or downwards, the pusher plate 5 experiences the opposite movement because of the actuating pin 22 so that only the discharge volume is changed but not the mixture ratio. On the other hand, if the control lever 19 is swivelled around the mean axis 17, the sliding pad 18 is displaced through the slide guide 16 formed in the disc 15 and thereby causes the pusher plate 5 to be swivelled around a pivotal axis 24 arranged below the head-piece 11, perpendicular to the mean axis 17. It is obvious that only the two inlet cross-sections of the inflow passages 7 running parallel to each other are changed inversely so that the mixture of hot and cold water, i.e., the mixed water temperature, is changed, but not the total outflow volume. To enable the pusher plate to be displaced both parallel to the mean axis 17 i.e. changing the out-flow volume, and also to be swivelled around the pivotal axis 24, i.e. changing the temperature of the mixed water, the pivotal axis 24 is formed by a pivot pin 25 which is guided in axial movement in an axial groove 26 in the bushing 4.

Figure 3:
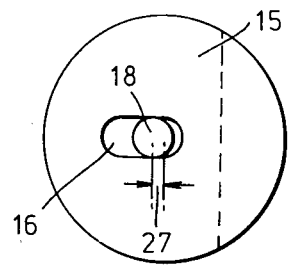
FIG. 3 shows a slide guide in the middle position.
Figure 4:
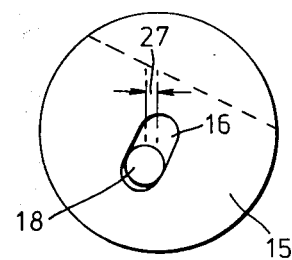
FIG. 4 shows the slide guide in the end left-hand position.
Figure 5:
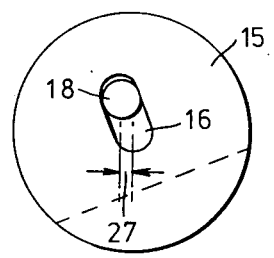
FIG. 5 shows the slide guide in the end right-hand position.

FIGS. 3 to 5 once more show clearly the slide guide of the pusher plate 5. In FIG. 3, the sliding pad 18 is located in the middle position in the slide guide and, as can be clearly seen, is only slightly changed in this range depending upon the selection of the displacement 27 from the mean axis 17 in relation to the swivel angle of the control lever. In the end ranges, shown in FIGS. 4 and 5, on the other hand, an accelerated displacement in relation to the swivel angle of the control lever occurs.

Figure 6:
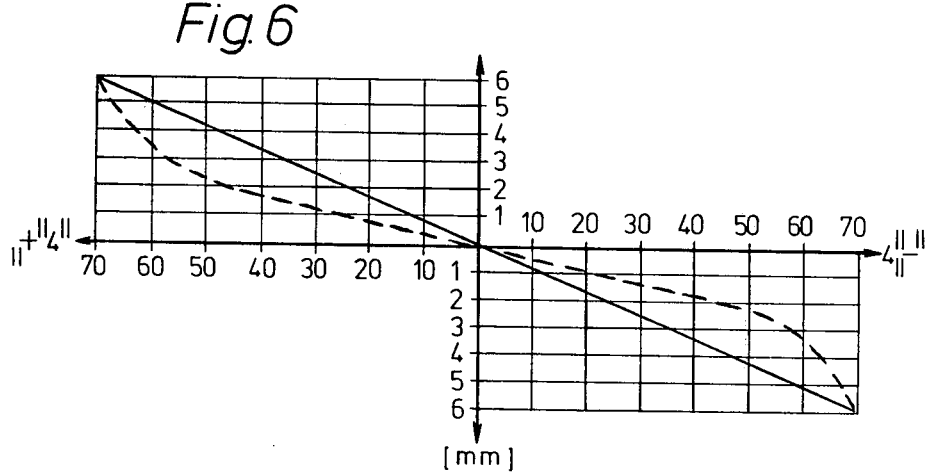
FIG. 6 shows a schematic diagram to render the mode of operation of the faucet more visible.

This relationship is shown schematically in FIG. 6, whereby the swivel angle from the middle position is plotted on the abscissa as shown in FIG. 3 and the displacement of the sliding pad is shown on the ordinate in millimeters. The dotted line here shows the displacement in relation to the swivel angle. It can be clearly seen from this schematic diagram that a retarded displacement of the sliding pad 18 occurs in the medium range and an accelerated displacement in the end ranges. The required extension of the preferred setting range can be optimized by means of suitable selection of the displacement 27.

The prescribed control system can, of course, be provided with a grip knob instead of a control lever. To hold the handle, a bushing, axially fixed but rotatable around the mean axis 17 can be arranged on the armature housing on which a grip knob is arranged rotatably fixed but axially movable. Out-flow volume regulation is then provided by axial displacement of the grip knob whereby one or more pins on the grip knob are guided in the wall of the bushing through radial slots and provide connection with the head-piece of the pusher plate.

What is claimed is:

1. A mixing valve for mixing hot and cold water sources and providing an output thereof comprising:
   a valve housing having a central bore having a longitudinal axis, first and second passageways and an outlet;
   first and second inlets on said housing for respectively receiving said hot and cold water sources and said inlets communicating with said first and second passageways;
   a head-piece casing mounted on said housing and rotatable about said longitudinal axis;
   a first valve plate mounted within said bore having a surface parallel to said longitudinal axis and having first and second inlet bores communicating with said first and second passageways, respectively, and an outlet bore communicating with said outlet;
   handle means pivotally connected to said head-piece;
   a pusher plate supported in said central bore and movable parallel to said longitudinal axis;
   a second valve plate carried by said pusher plate, said second valve plate having a surface positioned parallel to said longitudinal axis, said second valve plate surface having a mixing passage and said second valve plate adapted to slideably engage said first valve plate surface to position said mixing passage in communication with said first and second inlet bores and said outlet bore;
   first means connecting said pusher plate to said handle for translating a displacement of said handle in a direction substantially parallel to said longitudinal axis to a corresponding displacement of said second valve plate parallel to said longitudinal axis to regulate the volume of mixed water; and,
   pivot means for translating a rotational displacement of said head-piece to a pivotal displacement of said pusher plate about an axis perpendicular to said longitudinal axis whereby said second valve plate regulates the mixture of hot and cold water, said pivot means including a slide guide in said head-piece and rotatable about said longitudinal axis, and a sliding pad connected to said pusher plate, said sliding pad being displaced from said longitudinal axis and adapted to cooperatively engage said slide guide.

2. A mixing valve in accordance with claim 1 wherein said pivot means includes:
   a pivot pin connected to said pusher plate and extending perpendicular to said longitudinal axis thereof and support means for said pivot pin.

3. A mixing valve in accordance with claim 2 further comprising,
   a bushing member mounted in said central bore; and wherein:
   said support means comprises an axial groove on said bushing member adapted to cooperatively engage said pivot pin,
   said first means further includes an activating pin connected to said handle means, and
   said pusher plate includes a recess adapted to cooperatively engage said pin.

4. A mixing valve in accordance with claim 3 wherein said handle means comprises a control lever and said first means includes second pivot means connecting said handle means to said head-piece.

* * * * *